(12) United States Patent
Jones et al.

(10) Patent No.: US 11,145,178 B1
(45) Date of Patent: Oct. 12, 2021

(54) PASSENGER REMINDER SYSTEM

(71) Applicants: Linda Marie Jones, Nashville, NC (US); Joseph Alford, Nashville, NC (US)

(72) Inventors: Linda Marie Jones, Nashville, NC (US); Joseph Alford, Nashville, NC (US)

( * ) Notice: Subject to any disclaimer, the term of this patent is extended or adjusted under 35 U.S.C. 154(b) by 0 days.

(21) Appl. No.: 16/853,836

(22) Filed: Apr. 21, 2020

(51) Int. Cl.
| | |
|---|---|
| *B60Q 1/00* | (2006.01) |
| *G08B 21/02* | (2006.01) |
| *G08B 21/24* | (2006.01) |
| *B60Q 5/00* | (2006.01) |
| *B60R 21/015* | (2006.01) |
| *B60Q 3/00* | (2017.01) |
| *G08B 21/22* | (2006.01) |

(52) U.S. Cl.
CPC .......... *G08B 21/0205* (2013.01); *B60Q 3/00* (2013.01); *B60Q 5/00* (2013.01); *B60R 21/01512* (2014.10); *G08B 21/22* (2013.01); *G08B 21/24* (2013.01)

(58) Field of Classification Search
CPC .... G08B 21/0205; G08B 21/22; G08B 21/24; B60R 21/01512; B60Q 3/00; B60Q 5/00
See application file for complete search history.

(56) References Cited

U.S. PATENT DOCUMENTS

| | | | |
|---|---|---|---|
| 5,621,277 A * | 4/1997 | Ricca | B60Q 1/14 315/86 |
| 6,922,147 B1 * | 7/2005 | Viksnins | B60N 2/002 340/573.1 |
| 7,218,211 B2 | 5/2007 | Ho | |
| 7,714,737 B1 * | 5/2010 | Morningstar | G08B 21/24 340/667 |

(Continued)

FOREIGN PATENT DOCUMENTS

WO  2016149778  9/2016

OTHER PUBLICATIONS

Visconti et al., Innovative complete solution for health safety of children unintentionally forgotten in a car: a smart Arduino-based system with user app for remote control (Year: 2020).*

(Continued)

*Primary Examiner* — Quang Pham (57) ABSTRACT

The passenger reminder system is an alarm system. The passenger reminder system monitors a vehicle for the presence of an operator. The passenger reminder system monitors the vehicle for the presence of a passenger. The passenger reminder system generates one or more audible alarms and one or more visible alarms when the following alarm condition occurs: a) a passenger is in the vehicle; while simultaneously, b) the operator of the vehicle leaves the vehicle. The passenger reminder system comprises the vehicle, a logic module, and a plurality of supplemental alarms. The vehicle, the logic module, and the plurality of (Continued)

supplemental alarms are electrically connected. The logic module monitors the vehicle for the alarm condition. If the logic module detects the alarm condition, the logic module initiates the operation of: a) the plurality of supplemental alarms; and, b) a plurality of alarms provisioned with the vehicle.

4 Claims, 4 Drawing Sheets

(56) References Cited

U.S. PATENT DOCUMENTS

| | | | | |
|---|---|---|---|---|
| 8,063,788 | B1* | 11/2011 | Morningstar | G08B 21/24 340/667 |
| D653,463 | S | 2/2012 | Hartenstine | |
| 8,190,332 | B2* | 5/2012 | Saban | B60N 2/28 701/45 |
| 8,232,874 | B1* | 7/2012 | Aneiros | B60H 1/00657 340/438 |
| 8,892,302 | B1* | 11/2014 | McDonald | G08B 21/22 701/36 |
| 9,014,920 | B1* | 4/2015 | Torres | G08B 13/00 701/45 |
| 9,227,484 | B1* | 1/2016 | Justice | B60H 1/00742 |
| 9,403,437 | B1* | 8/2016 | McDonald | G08B 21/24 |
| 9,741,224 | B1* | 8/2017 | Singh | G08B 21/22 |
| 9,969,328 | B1* | 5/2018 | Dada | B60R 21/01556 |
| 10,068,452 | B1* | 9/2018 | Nunez | B60N 2/2881 |
| 10,147,294 | B2 | 12/2018 | Biondo | |
| 10,442,353 | B1* | 10/2019 | Norman | B60N 2/26 |
| 10,883,302 | B2* | 1/2021 | Sugiyama | E05F 15/697 |
| 2003/0122662 | A1* | 7/2003 | Quinonez | B60N 2/002 340/457 |
| 2003/0220729 | A1* | 11/2003 | Doddek | B60K 31/18 701/50 |
| 2004/0217855 | A1* | 11/2004 | Wang | B60Q 1/326 340/468 |
| 2005/0057350 | A1* | 3/2005 | Younse | G08B 21/22 340/457.1 |
| 2005/0225440 | A1 | 10/2005 | Simmons | |
| 2006/0103516 | A1* | 5/2006 | Zang | G08B 21/22 340/457 |
| 2006/0208911 | A1* | 9/2006 | Davis | B60N 2/26 340/573.4 |
| 2006/0273917 | A1* | 12/2006 | Rams, Jr. | B60N 2/002 340/667 |
| 2007/0052529 | A1* | 3/2007 | Perez | G08B 21/22 340/457 |
| 2007/0057780 | A1* | 3/2007 | Bridges | B60Q 9/00 340/438 |
| 2007/0096891 | A1* | 5/2007 | Sheriff | B60N 2/002 340/457.1 |
| 2007/0132571 | A1 | 6/2007 | Rossi | |
| 2007/0205884 | A1* | 9/2007 | Federspiel | B60R 21/01512 340/457.1 |
| 2007/0268119 | A1* | 11/2007 | Cram | B60Q 9/00 340/457 |
| 2008/0088426 | A1* | 4/2008 | Lima | B60N 2/002 340/457.1 |
| 2009/0027188 | A1* | 1/2009 | Saban | B60N 2/002 340/521 |
| 2009/0079557 | A1* | 3/2009 | Miner | G08B 21/0269 340/457.1 |
| 2011/0102169 | A1* | 5/2011 | Orbach | G08B 21/22 340/457 |
| 2011/0241867 | A1* | 10/2011 | Neal | G08B 21/0211 340/457 |
| 2011/0285522 | A1* | 11/2011 | Schuessler | E05B 81/70 340/426.22 |
| 2012/0007741 | A1* | 1/2012 | Laffey, Sr. | B60N 2/002 340/573.1 |
| 2012/0074757 | A1* | 3/2012 | Banda | G09F 3/16 297/468 |
| 2013/0106598 | A1* | 5/2013 | Silveira | B60N 2/28 340/457.1 |
| 2013/0194089 | A1* | 8/2013 | Estrada | B60Q 1/50 340/457.1 |
| 2014/0015664 | A1* | 1/2014 | Watson | G08B 21/24 340/457.1 |
| 2014/0184404 | A1* | 7/2014 | Schoenberg | B60R 21/015 340/457 |
| 2014/0253314 | A1* | 9/2014 | Rambadt | B60N 2/002 340/457.1 |
| 2014/0266662 | A1* | 9/2014 | Matos | G08B 21/0288 340/457 |
| 2014/0277935 | A1* | 9/2014 | Daman | B60N 2/28 701/36 |
| 2015/0014082 | A1* | 1/2015 | Kasper | B60T 17/22 180/282 |
| 2015/0165932 | A1* | 6/2015 | Maley | B60N 2/002 340/457 |
| 2015/0279195 | A1* | 10/2015 | Qian | G08B 21/22 340/540 |
| 2015/0286882 | A1* | 10/2015 | Nicol | G06K 9/00838 348/148 |
| 2016/0042616 | A1* | 2/2016 | Dorsey | G08B 21/24 340/457 |
| 2016/0339838 | A1* | 11/2016 | Diaz | B60N 2/2866 |
| 2017/0089101 | A1* | 3/2017 | Bendel | E05B 41/00 |
| 2017/0096080 | A1* | 4/2017 | McLean, Jr. | B60N 2/2845 |
| 2017/0106789 | A1* | 4/2017 | Holdbrook-Smith | G08B 21/24 |
| 2017/0116839 | A1* | 4/2017 | Friedman | B60N 2/26 |
| 2017/0182938 | A1* | 6/2017 | Byrd, I | G08B 21/24 |
| 2017/0190287 | A1* | 7/2017 | Gjoni | G08B 21/24 |
| 2017/0232887 | A1* | 8/2017 | Clontz | B60N 2/002 340/457 |
| 2018/0033277 | A1* | 2/2018 | Entis | G08B 21/02 |
| 2018/0053398 | A1* | 2/2018 | Kharbawi | G08B 21/22 |
| 2018/0065504 | A1* | 3/2018 | Lan | G08B 21/0283 |
| 2018/0253959 | A1* | 9/2018 | Andrade | G08B 21/24 |
| 2018/0361927 | A1* | 12/2018 | Debowski | G08B 21/24 |
| 2019/0039546 | A1* | 2/2019 | Elangovan | G07C 9/0069 |
| 2019/0088103 | A1* | 3/2019 | Lebron | G08B 21/0225 |
| 2019/0088104 | A1* | 3/2019 | Crewe | G06K 9/00369 |
| 2019/0135228 | A1* | 5/2019 | Haymond | B60R 22/48 |
| 2019/0141756 | A1* | 5/2019 | Lei | H04L 69/18 |
| 2020/0071967 | A1* | 3/2020 | Adams | G06K 9/00838 |

OTHER PUBLICATIONS

Wu et al, Baby Care System Design for Multi-Sensor Applications (Year: 2019).*
Diewald et al., RF-based Child Occupation Detection in the Vehicle Interior (Year: 2016).*
Aiello et al., Next-generation technologies for preventing accidental death of children trapped in parked vehicles (Year: 2014).*
Dhanasekaran et al., Active cabin safety system for M1 category vehicles (Year: 2015).*
Ip, A Method and System for Actively Monitoring an Unattended Child in a Vehicle (Year: 2014).*
Ferrara et al., Children left unattended in parked vehicles a focus on recent italian cases and a review of literature (Year: 2013).*
IPCOM, Vehicle Passenger Safety Monitoring Assistant (Year: 2016).*
Ranjan et al., A child-left-behind warning system based on capacitive sensing principle (Year: 2013).*
Sasidharan et al., Vehicle cabin safety alert system (Year: 2015).*
Shaout et al., Cloud Based System for Detecting Children in Automobiles (Year: 2018).*

* cited by examiner

PASSENGER REMINDER SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of signaling and alarm systems, more specifically, an alarm for ensuring the safety of persons. (G08B32/02)

SUMMARY OF INVENTION

The passenger reminder system is an electrical device. The passenger reminder system is configured for use with a vehicle. The passenger reminder system is an alarm system. The passenger reminder system monitors the vehicle for the presence of an operator. The passenger reminder system monitors the vehicle for the presence of a passenger. The passenger reminder system generates one or more audible alarms and one or more visible alarms when the following alarm condition occurs: a) a passenger is in the vehicle; while simultaneously, b) the operator of the vehicle leaves the vehicle. The passenger reminder system comprises the vehicle, a logic module, and a plurality of supplemental alarms. The vehicle, the logic module, and the plurality of supplemental alarms are electrically connected. The logic module monitors the vehicle for the alarm condition. If the logic module detects the alarm condition, the logic module initiates the operation of: a) the plurality of supplemental alarms; and, b) a plurality of alarms provisioned with the vehicle.

These together with additional objects, features and advantages of the passenger reminder system will be readily apparent to those of ordinary skill in the art upon reading the following detailed description of the presently preferred, but nonetheless illustrative, embodiments when taken in conjunction with the accompanying drawings.

In this respect, before explaining the current embodiments of the passenger reminder system in detail, it is to be understood that the passenger reminder system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the passenger reminder system.

It is therefore important that the claims be regarded as including such equivalent construction insofar as they do not depart from the spirit and scope of the passenger reminder system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
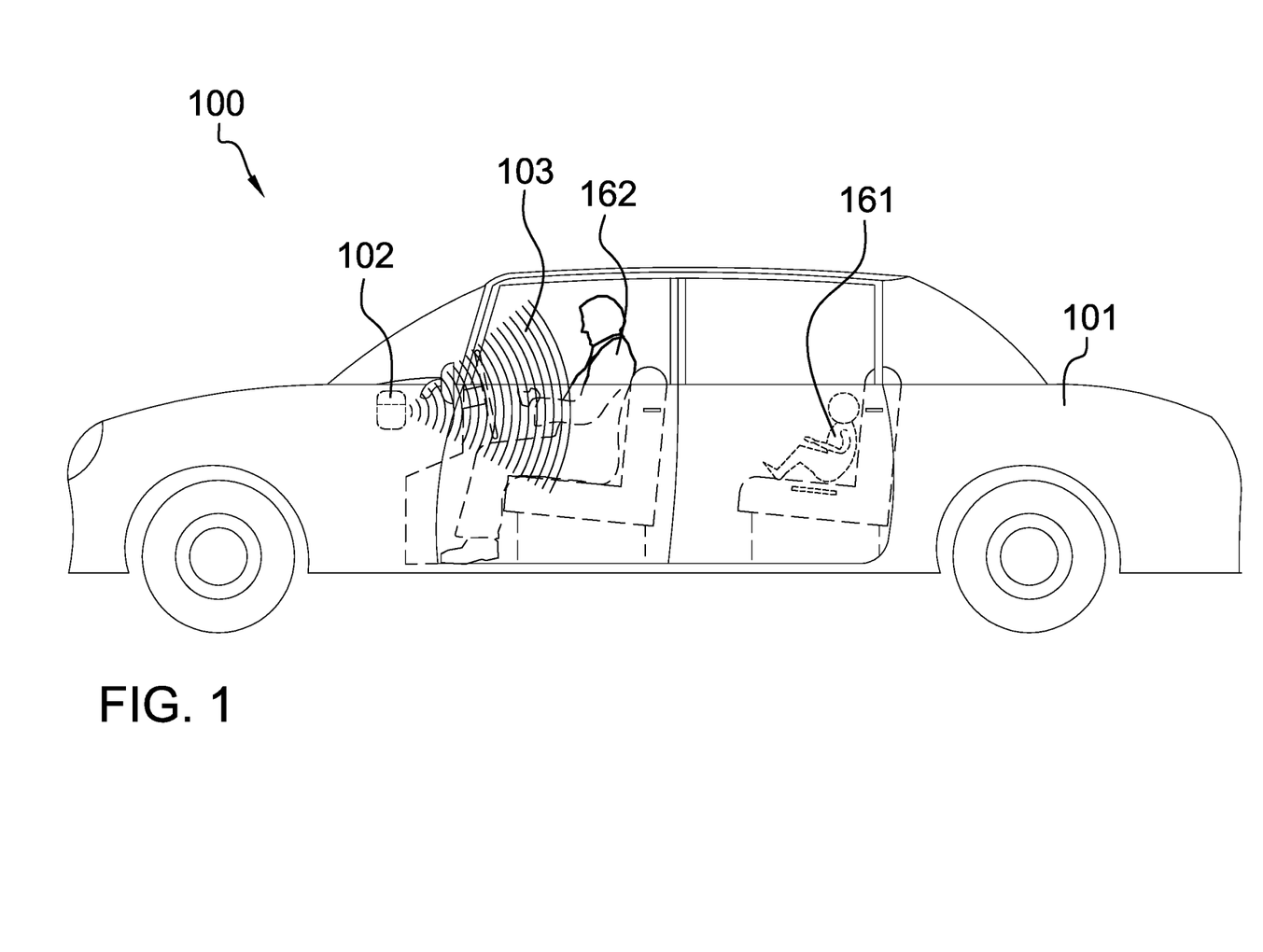
FIG. 1 is an in-use view of an embodiment of the disclosure.
Figure 2:
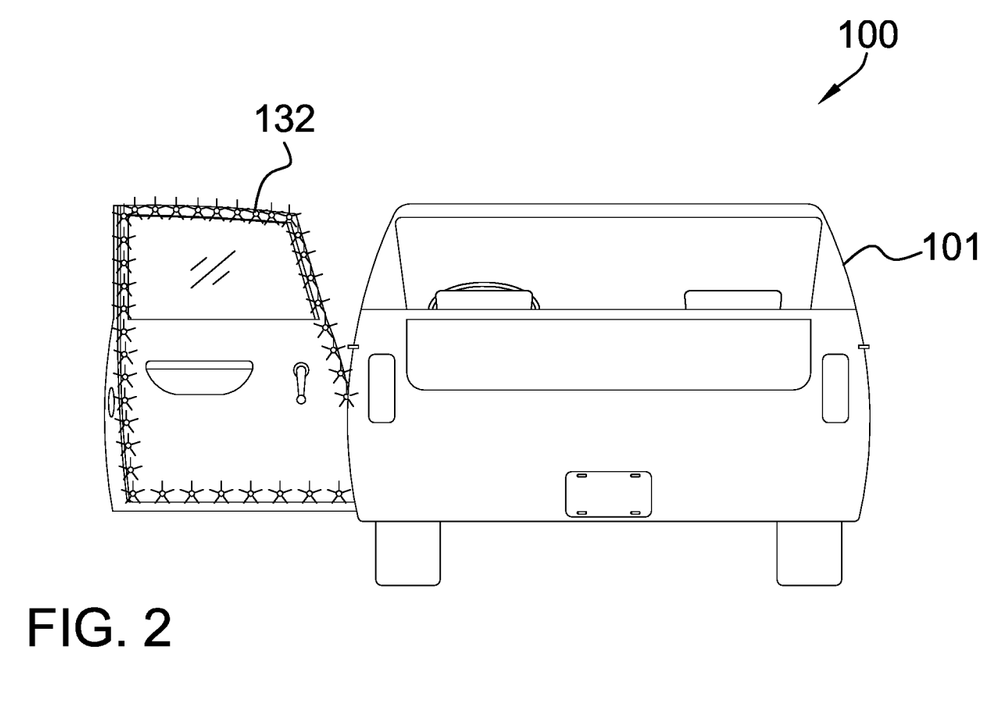
FIG. 2 is a rear view of an embodiment of the disclosure.
Figure 3:
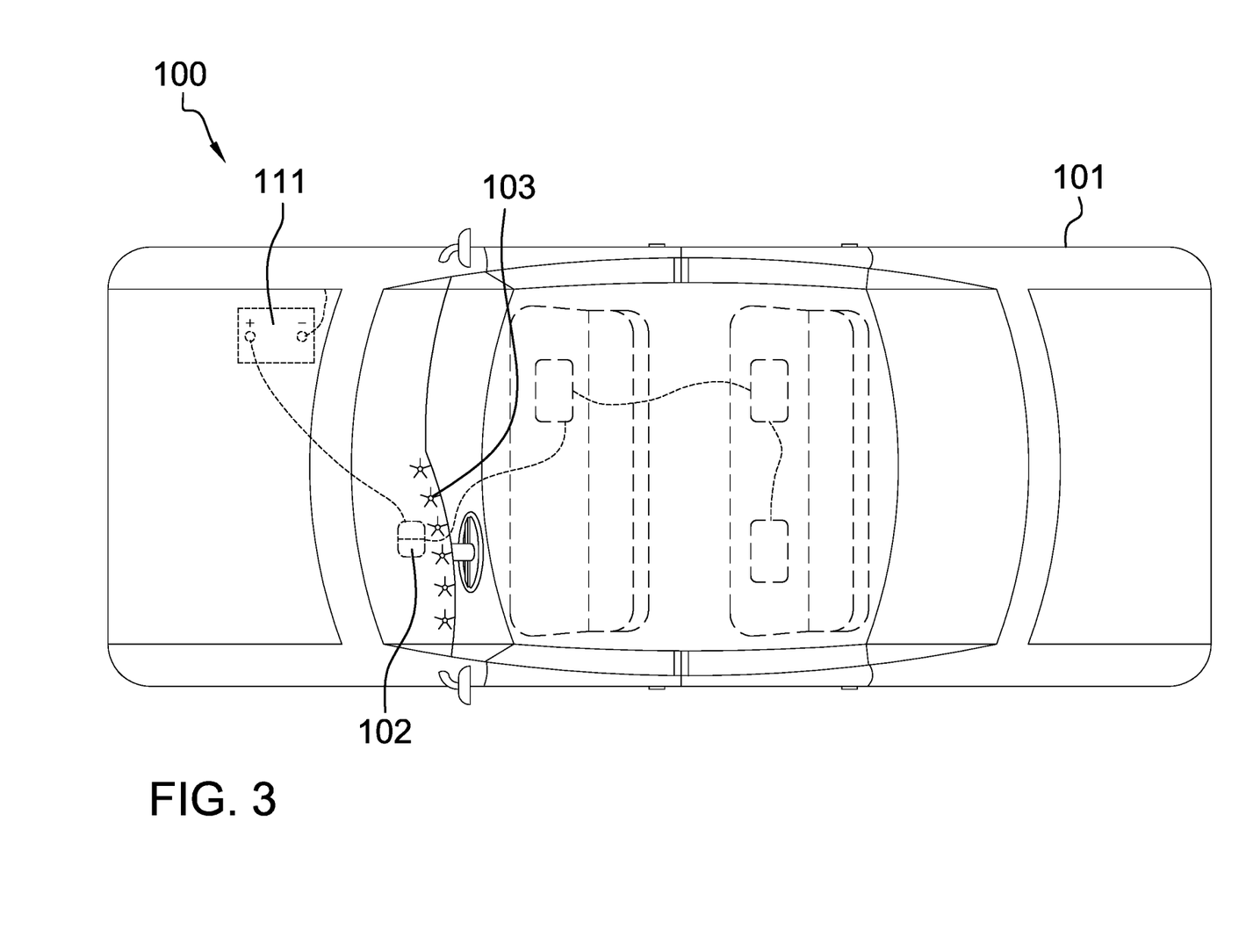
FIG. 3 is a top view of an embodiment of the disclosure.
Figure 4:
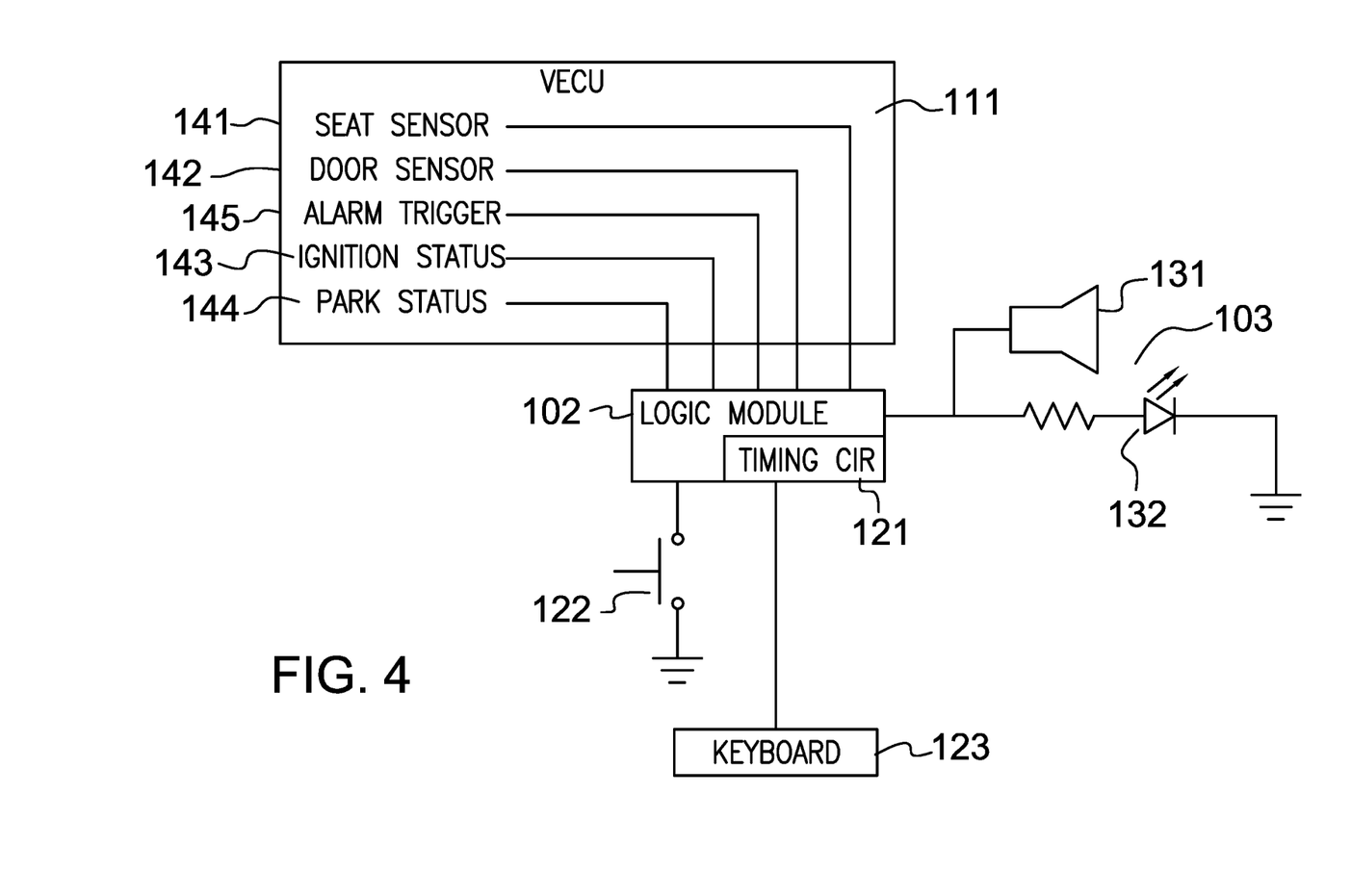
FIG. 4 is a schematic view of an embodiment of the disclosure.

Detailed reference will now be made to one or more potential embodiments of the disclosure, which are illustrated in FIGS. 1 through 4.

The passenger reminder system 100 (hereinafter invention) is an electrical device. The invention 100 is configured for use with a vehicle 101. The invention 100 is an alarm system. The invention 100 monitors the vehicle 101 for the presence of a vehicle 101 operator 162. The invention 100 monitors the vehicle 101 for the presence of a vehicle 101 passenger 161. The invention 100 generates one or more audible alarms and one or more visible alarms when the following alarm condition occurs: a) a vehicle 101 passenger 161 is in the vehicle 101; while simultaneously, b) the vehicle 101 operator 162 of the vehicle 101 leaves the vehicle 101. The invention 100 comprises the vehicle 101, a logic module 102, and a plurality of supplemental alarms 103. The vehicle 101, the logic module 102, and the plurality of supplemental alarms 103 are electrically connected. The logic module 102 monitors the vehicle 101 for the alarm condition. If the logic module 102 detects the alarm condition, the logic module 102 initiates the operation of: a) the plurality of supplemental alarms 103; and, b) a plurality of alarms provisioned with the vehicle 101.

The vehicle 101 is a motorized vehicle 101. The vehicle 101 is used for carrying a vehicle 101 operator 162 and one or more vehicle 101 passengers 161 over a road network.

The vehicle 101 is defined elsewhere in this disclosure. The vehicle 101 further comprises a VECU 111.

The VECU 111 is the vehicle 101 engine control unit of the vehicle 101. The VECU 111 is an electric circuit that controls the electrical operation of the vehicle 101. The VECU 111 detects when one or more vehicle 101 passengers 161 are seated in the vehicle 101. The VECU 111 detects when a door of the vehicle 101 is open. The VECU 111 detects the transmission status of the vehicle 101 to determine when the transmission is in the parked position. The VECU 111 detects the ignition status of the vehicle 101 is off. The VECU 111 operates a general alarm system that generates a plurality of alarms that are audible and visible from the exterior of the vehicle 101. The VECU 111 electrically connects to the logic module 102. The VECU 111 is defined elsewhere in this disclosure.

The VECU 111 further comprises a plurality of seat sensor signals 141, a door sensor signal 142, an ignition status signal 143, a park status signal 144, and an alarm trigger signal 145.

The plurality of seat sensor signals 141 is an electric signal that is transmitted from the VECU 111 to the logic module 102 that indicates that the VECU 111 has detected that one or more vehicle 101 passengers 161 are seated in the vehicle 101.

The door sensor signal 142 is an electric signal that is transmitted from the VECU 111 to the logic module 102 that indicates that the VECU 111 has detected that the vehicle 101 operator 162 side door of the vehicle 101 is open.

The ignition status signal 143 is an electric signal that is transmitted from the VECU 111 to the logic module 102 that indicates that the VECU 111 has detected that the ignition system of the vehicle 101 has been turned on.

The park status signal 144 is an electric signal that is transmitted from the VECU 111 to the logic module 102 that indicates that the VECU 111 has detected that the transmission system of the vehicle 101 has been set into the park position.

The alarm trigger signal 145 is an electric signal that is received by the VECU 111 from the logic module 102.

The alarm trigger signal 145 indicates to the VECU 111 that the logic module 102 is requesting that the general alarm system of the vehicle 101 be activated.

The logic module 102 and the plurality of supplemental alarms 103 mount in the vehicle 101. The logic module 102 monitors the interior passenger space within the vehicle 101. The logic module 102 is an electric circuit. The logic module 102 is a programmable device. The logic module 102 is defined elsewhere in this disclosure. The logic module 102 further comprises a timing circuit 121, an override switch 122, and an override keyboard 123.

The logic module 102 monitors the VECU 111 of the vehicle 101 to determine when a vehicle 101 passenger 161 occupies a seat in the vehicle 101. The logic module 102 monitors the VECU 111 of the vehicle 101 to determine when a door of the vehicle 101 is open. The logic module 102 monitors the VECU 111 of the vehicle 101 to determine whether the vehicle 101 is in operation. The logic module 102 monitors the VECU 111 of the vehicle 101 to determine whether the vehicle 101 is parked.

When the logic module 102 simultaneously detects the following conditions: a) one or more vehicle 101 passengers 161 remain in their seat; b) a door of the vehicle 101 is open; c) the transmission of the vehicle 101 is in the park position; and, d) the ignition status of the vehicle 101 is off; then, e) the logic module 102 will initiate a timing circuit 121 to count down a first previously determined amount of time.

When the first previously determined amount of time elapses without the logic module 102 detecting that the vehicle 101 passengers 161 have evacuated their seats, the logic module 102 initiates the operation of the plurality of supplemental alarms 103. When the first previously determined amount of time elapses without the logic module 102 detecting that the vehicle 101 passengers 161 have evacuated their seats, the logic module 102 further transmits an electric signal to the alarm trigger signal 145 of the VECU 111 of the vehicle 101 which activates the general alarm system provisioned with the vehicle 101.

The timing circuit 121 is an electric circuit that forms a subcomponent of the logic module 102. The logic module 102 uses the timing circuit 121 as a countdown timing device that measures the passage of a previously determined amount of time selected from one or more previously determined amounts of time. The timing circuit 121 triggers the logic module 102 to take an action after the selected previously determined amount of time has elapsed. The timing circuit 121 and the timing device are defined elsewhere in this disclosure. The timing circuit 121 measures a first previously determined amount of time and a second previously determined amount of time.

The override switch 122 is a momentary switch. The override switch 122 electrically connects to the logic module 102. The override switch 122 mounts in the vehicle 101 such that the override switch 122 is accessible from the interior passenger space of the vehicle 101. The logic module 102 monitors the override switch 122.

When the logic module 102 detects that the override switch 122 has been actuated when the operation of the plurality of supplemental alarms 103 has not been initiated, the logic module 102 takes no action. When the logic module 102 detects that the override switch 122 has been actuated when the operation of the plurality of supplemental alarms 103 has been initiated, the logic module 102 discontinues the operation of the plurality of supplemental alarms 103 and the general vehicle alarm 101 for a second previously determined amount of time. If after the second previously determined amount of time has elapsed, the logic module 102 has not detected that an override code has been entered through the override keyboard 123, the logic module 102: a) reinitiates the operation of the plurality of supplemental alarms 103; and, b) transmits an electric signal to the alarm trigger signal 145 of the VECU 111 of the vehicle 101 to reinitiate the operation of the general alarm system of the vehicle 101.

The override keyboard 123 is an electric device. The override keyboard 123 in an alphanumeric input device. The override keyboard 123 electrically connects to the logic module 102. The logic module 102 monitors the override keyboard 123. An override code is entered into the logic module 102 through the override keyboard 123.

When the logic module 102 receives an authentic override code through the override keyboard 123 when the operation of the plurality of supplemental alarms 103 has not been initiated, the logic module 102 takes no action. When the logic module 102 receives an authentic override code through the override keyboard 123 when the operation of the plurality of supplemental alarms 103 has been initiated, the logic module 102 discontinues the operation of the plurality of supplemental alarms 103 and the general vehicle alarm 101 and suspends the operation of the invention 100. The operation of the invention 100 is reinitiated once the ignition status signal 143 of the VECU 111 indicates that the ignition of the vehicle 101 has been turned on.

The plurality of supplemental alarms 103 generates an alarm that is audible within the interior passenger space of the vehicle 101. The plurality of supplemental alarms 103 generates an alarm that is visible within the interior passenger space of the vehicle 101. Each of the plurality of supplemental alarms 103 is an alarm that is directed towards the interior passenger space of the vehicle 101. The plurality of supplemental alarms 103 alert the vehicle 101 operator 162 of the vehicle 101 that one or more vehicle 101 passengers 161 remain in the interior passenger space of the vehicle 101. The logic module 102 controls the operation of the plurality of supplemental alarms 103. The plurality of supplemental alarms 103 comprise a speaker 131 and a lamp circuit 132.

The speaker 131 is a transducer. The speaker 131 receives an electric signal from the logic module 102 and converts the electric signal into an audible sound. The speaker 131 mounts in the interior passenger space of the vehicle 101 such that the audible sound generated by the speaker 131 can be heard from within the interior passenger space of the vehicle 101.

The lamp circuit 132 is an electric circuit. The lamp circuit 132 generates an illumination. The logic module 102 controls the operation of the lamp circuit 132. The lamp circuit 132 mounts in the vehicle 101 operator 162 side door of the vehicle 101 such that the illumination generated by the lamp circuit 132 is visible from within the interior passenger space of the vehicle 101 when: a) logic module 102 has initiated the operation of the plurality of supplemental alarms 103; and, b) the vehicle 101 operator 162 side door of the vehicle 101 is open.

The following definitions were used in this disclosure:

Countdown: As used in this disclosure, a countdown refers to the announcement, display, or presentation of numerical information in descending order.

Diode: As used in this disclosure, a diode is a two terminal semiconductor device that allows current flow in only one direction. The two terminals are called the anode and the cathode. Electric current is allowed to pass from the anode to the cathode.

Door: As used in this disclosure, a door is a movable or removable barrier that is attached to a chamber for the purpose of allowing or preventing access through an aperture into the chamber.

Ignition Device: As used in this disclosure, an ignition device is an electrically or mechanically powered device that starts the operation of a piece of equipment that is powered using a combustion reaction.

Keyboard: As used in this disclosure, a keyboard is a panel that further comprises a plurality of buttons that are commonly referred to as keys. The keyboard is commonly used to operate devices including, but not limited to, logical devices and musical instruments.

Lamp: As used in this disclosure, a lamp is an electrical circuit that generates (typically visible spectrum) electromagnetic radiation.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Mass: As used in this disclosure, refers to a quantity of matter within a structure. Mass is measured and quantified by the reaction of the structure to a force. Mass can also be roughly quantified as a function of atomic composition and the number of atoms contained within the structure. The term weight refers to the quantification of a mass that is exposed to the force of gravity.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Passenger: As used in this disclosure, a passenger is an individual that is transported by a vehicle.

Pressure: As used in this disclosure, pressure refers to a measure of force per unit area.

Pressure Plate Switch: As used in this disclosure, pressure plate switch is a commercially available switching device wherein a switch is placed underneath a flexible or semi-rigid surface such that when pressure is applied to or removed from the flexible or semi-rigid surface the underlying switch is actuated. An example of a commercially marketed pressure switch is commonly marketed as a bed alarm with a sensor pad for dementia patients. The sensor pad is commonly a pressure switch.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

Seat: As used in this disclosure, a seat is a structure that a person can sit on. Chair is a common synonym for a seat.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time. This disclosure assumes that the logic module is provisioned with a timing circuit that can be used as a timing device. A timing device that activates an audible alarm is often referred to as a timer.

Transducer: As used in this disclosure, a transducer is a device that converts a physical quantity, such as pressure or brightness into an electrical signal or a device that converts an electrical signal into a physical quantity.

Trigger: As used in this disclosure, a trigger is a subcomponent of a device that is used to activate a mechanism.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a motorized device that is used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A passenger reminder system comprising:
a vehicle, a logic module, and a plurality of supplemental alarms;
wherein the vehicle, the logic module, and the plurality of supplemental alarms are electrically connected;
wherein the passenger reminder system is adapted to monitor the vehicle for the presence of a vehicle operator as well as a vehicle passenger;
wherein the passenger reminder system generates one or more audible alarms and one or more visible alarms when the following alarm condition occurs: a) the vehicle passenger is in the vehicle; while simultaneously, b) the vehicle operator of the vehicle leaves the vehicle;
wherein the logic module further comprises a timing circuit, an override switch, and an override keyboard;
wherein the timing circuit, the override switch, and the override keyboard electrically connect to the logic module;
wherein the override switch mounts in the vehicle such that the override switch is accessible from the interior passenger space of the vehicle;
wherein the logic module monitors the override switch;
wherein when the logic module detects that the override switch has been actuated when an operation of the plurality of supplemental alarms has not been initiated, the logic module takes no action;
wherein when the logic module detects that the override switch has been actuated when the operation of the plurality of supplemental alarms has been initiated, the logic module discontinues the operation of the plurality of supplemental alarms and a general alarm system for a second previously determined amount of time;
wherein the general alarm system generates a plurality of alarms that are audible and visible from the exterior of the vehicle and wherein the plurality supplemental alarms comprise a speaker and a lamp circuit mounted in the vehicle;
wherein if after the second previously determined amount of time has elapsed, the logic module has not detected that an override code has been entered through the override keyboard, the logic module: a) reinitiates the operation of the plurality of supplemental alarms; and, b) transmits an electric signal to an alarm trigger signal of a VECU (Vehicle Engine Control Unit) of the vehicle to reinitiate an operation of the general alarm system of the vehicle;
wherein the passenger reminder system is an electrical device;
wherein the passenger reminder system is an alarm system;
wherein the logic module monitors the vehicle for the alarm condition;
wherein if the logic module detects the alarm condition, the logic module initiates the operation of: a) the plurality of supplemental alarms: and b) a plurality of alarms provisioned with the vehicle;
wherein the vehicle further comprises the VECU;
wherein the VECU detects when one or more vehicle passengers are seated in the vehicle;
wherein the VECU detects when a vehicle operator side door of the vehicle is open;
wherein the VECU detects a transmission status of the vehicle to determine when the transmission status is in a parked position:
wherein the VECU detects an ignition status of an ignition system of the vehicle is off;
wherein the VECU operates the general alarm system that generates a plurality of alarms that are audible and visible from the exterior of the vehicle;
wherein the VECU electrically connects to the logic module;
wherein the logic module and the plurality of supplemental alarms mount in the vehicle;
wherein the logic module monitors the interior passenger space within the vehicle;
wherein the logic module is an electric circuit;
wherein the plurality of supplemental alarms generates an alarm that is audible within the interior passenger space of the vehicle;

wherein the plurality of supplemental alarms generates an alarm that is visible within the interior passenger space of the vehicle;

wherein each of the plurality of supplemental alarms is an alarm that is directed towards the interior passenger space of the vehicle;

wherein the plurality of supplemental alarms alert the vehicle operator of the vehicle that the one or more vehicle passengers remain in the interior passenger space of the vehicle;

wherein the logic module controls the operation of the plurality of supplemental alarms;

wherein the VECU further comprises a plurality of seat sensor signals, a door sensor signal, an ignition status signal, a park status signal, and an alarm trigger signal;

wherein the plurality of seat sensor signals is an electric signal that is transmitted from the VECU to the logic module that indicates that the VECU has detected that the one or more vehicle passengers are seated in the vehicle;

wherein the door sensor signal is an electric signal that is transmitted from the VECU to the logic module that indicates that the VECU has detected that the vehicle operator side door of the vehicle is open;

wherein the ignition status signal is an electric signal that is transmitted from the VECU to the logic module that indicates that the VECU has detected that the ignition system of the vehicle has been turned on;

wherein the park status signal is an electric signal that is transmitted from the VECU to the logic module that indicates that the VECU has detected that the transmission status of the vehicle has been set into the parked position;

wherein the alarm trigger signal is an electric signal that is received by the VECU from the logic module;

wherein the alarm trigger signal indicates to the VECU that the logic module is requesting that the general alarm system of the vehicle be activated;

wherein the speaker electrically connects to the logic module;

wherein the lamp circuit electrically connects to the logic module;

wherein the timing circuit is an electric circuit that forms a subcomponent of the logic module;

wherein the timing circuit measures a first previously determined amount of time and a second previously determined amount of time;

wherein the logic module is a programmable device;

wherein the logic module monitors the VECU of the vehicle to determine when the one or more vehicle passengers occupy seats in the vehicle;

wherein the logic module monitors the VECU of the vehicle to determine when the vehicle operator side door of the vehicle is open;

wherein the logic module monitors the VECU of the vehicle to determine whether the vehicle is in operation;

wherein the logic module monitors the VECU of the vehicle to determine whether the vehicle is in the parked position;

wherein when the logic module simultaneously detects the following conditions: a) the one or more vehicle passengers remain in their seat; b) the vehicle operator side door of the vehicle is open; c) the transmission status of the vehicle is in the parked position; and d) the ignition status of the vehicle is off; then e) the logic module will initiate the timing circuit to count down the first previously determined amount of time;

wherein when the first previously determined amount of time elapses without the logic module detecting that the one or more vehicle passengers have evacuated their seats, the logic module initiates the operation of the plurality of supplemental alarms;

wherein when the first previously determined amount of time elapses without the logic module detecting that the one or more vehicle passengers have evacuated their seats, the logic module further transmits an electric signal to the alarm trigger signal of the VECU of the vehicle which activates the general alarm system provisioned with the vehicle;

wherein the logic module uses the timing circuit as a countdown timing device that measures a passage of a previously determined amount of time selected from one or more previously determined amounts of time;

wherein the timing circuit triggers the logic module to take an action after the selected previously determined amount of time has elapsed;

wherein the override switch is a momentary switch;

wherein the override switch electrically connects to the logic module;

wherein the override keyboard is an electric device;

wherein the override keyboard in an alphanumeric input device:

wherein the override keyboard electrically connects to the logic module;

wherein the lamp circuit mounts in the vehicle operator side door of the vehicle such that an illumination generated by the lamp circuit is visible from within the interior passenger space of the vehicle when: a) logic module has initiated the operation of the plurality of supplemental alarms; and b) the vehicle operator side door of the vehicle is open.

2. The passenger reminder system according to claim 1, wherein the override keyboard mounts in the vehicle such that the override keyboard is accessible from the interior passenger space of the vehicle;

wherein the logic module monitors the override keyboard;

wherein an override code is entered into the logic module through the override keyboard;

wherein when the logic module receives an authentic override code through the override keyboard when the operation of the plurality of supplemental alarms has not been initiated, the logic module takes no action;

wherein when the logic module receives an authentic override code through the override keyboard when the operation of the plurality of supplemental alarms has been initiated, the logic module discontinues the operation of the plurality of supplemental alarms and the general alarm system and suspends the operation of the passenger reminder system;

wherein the operation of the passenger reminder system is reinitiated once the ignition status signal of the VECU indicates that the ignition of the vehicle has been turned on.

3. The passenger reminder system according to claim 2 wherein the speaker is a transducer; wherein the speaker receives an electric signal from the logic module and converts the electric signal into an audible sound.

4. The passenger reminder system according to claim 3 wherein the lamp circuit is an electric circuit; wherein the lamp circuit generates an illumination.

* * * * *